(12) United States Patent
Omura et al.

(10) Patent No.: US 9,240,115 B2
(45) Date of Patent: Jan. 19, 2016

(54) POWER TRANSMISSION APPARATUS

(75) Inventors: Seiji Omura, Toyota (JP); Hiroyuki Nishiura, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 324 days.

(21) Appl. No.: 14/004,330

(22) PCT Filed: Mar. 11, 2011

(86) PCT No.: PCT/JP2011/001430
§ 371 (c)(1),
(2), (4) Date: Sep. 10, 2013

(87) PCT Pub. No.: WO2012/123983
PCT Pub. Date: Sep. 20, 2012

(65) Prior Publication Data
US 2013/0345946 A1 Dec. 26, 2013

(51) Int. Cl.
*F16G 5/00* (2006.01)
*F16G 1/00* (2006.01)
*G08B 21/00* (2006.01)
*F16H 7/02* (2006.01)
*G01M 13/02* (2006.01)

(52) U.S. Cl.
CPC ............... *G08B 21/00* (2013.01); *F16H 7/023* (2013.01); *G01M 13/023* (2013.01)

(58) Field of Classification Search
CPC ..... G08B 21/00; F16H 7/023; G01M 13/023; G01M 13/02; F16G 5/20; F16G 5/06; F16G 1/28; F16G 1/08; C08L 23/16; C08L 21/00
USPC ......... 474/261, 262, 263, 264, 268, 271, 260; 701/102; 198/811, 812, 810.02; 73/114.77; 59/84
See application file for complete search history.

(56) References Cited

U.S. PATENT DOCUMENTS

2009/0286076 A1* 11/2009 Xu ........................... C09D 5/22
428/339
2009/0303065 A1 12/2009 Lipowski

FOREIGN PATENT DOCUMENTS

| CN | 101443644 A | 5/2009 |
|---|---|---|
| JP | 62-295199 A | 12/1987 |
| JP | 04-094570 U | 8/1992 |
| JP | 2003-293815 A | 10/2003 |
| JP | 2004-196916 A * | 7/2004 |
| JP | 2004-196916 A | 7/2004 |

(Continued)

*Primary Examiner* — Hai Huynh
*Assistant Examiner* — Raza Najmuddin
(74) *Attorney, Agent, or Firm* — Kenyon & Kenyon LLP

(57) ABSTRACT

Disclosed is a power transmission apparatus to detect the deterioration state of a timing belt in use, thereby making it possible to detect at a high accuracy whether or not the timing belt reaches an exchanging time. The power transmission apparatus comprises a crankshaft pulley, an intake camshaft pulley, and a timing belt wound around the crankshaft pulley and the intake camshaft pulley. The timing belt contains a stress light emission material capable of emitting light when receiving an external force. The power transmission apparatus further comprises an optical sensor and an ECU. The optical sensor is disposed to measure light emitted from the timing belt. The ECU is operative to judge whether or not the timing belt is deteriorated and to judge that the timing belt reaches the exchanging time when the timing belt is judged to be deteriorated.

5 Claims, 6 Drawing Sheets

(56) References Cited

FOREIGN PATENT DOCUMENTS

| | | |
|---|---|---|
| JP | 2005-201408 A | 7/2005 |
| JP | 2007-239802 A | 9/2007 |
| JP | 2009-531604 A | 9/2009 |
| WO | 2007/109896 A1 | 10/2007 |

* cited by examiner

POWER TRANSMISSION APPARATUS

CROSS REFERENCE TO RELATED APPLICATION

This is a national phase application based on the PCT International Patent Application No. PCT/JP2011/001430 filed on Mar. 11, 2011, the entire contents of which are incorporated herein by reference.

TECHNICAL FIELD

The present invention relates to a power transmission apparatus which comprises a power transmission belt wounded around a drive pulley and a driven pulley to transmit driving power from the drive pulley to the driven pulley, and more particularly to a power transmission apparatus which can detect an exchanging time reached to exchange the power transmission belt with a new power transmission belt by detecting that the power transmission belt is deteriorated.

BACKGROUND ART

In general, an internal combustion engine having a valve mechanism of an overhead cam shaft type such as for example an automotive vehicle engine is required to transmit the rotation of a crankshaft disposed at the lower portion of the engine to a camshaft disposed at the upper portion of the engine. In order to normally operate the valve mechanism, the rotation of the crankshaft is required to be synchronized with the rotation of the camshaft. For this purpose, there have so far been used various kinds of timing belts as transmission means for transmitting the rotation of the crankshaft to the camshaft.

The timing belt thus used can function to synchronize the rotation of the crankshaft with the rotation of the camshaft. However, there is a possibility that the timing belt cannot synchronize the rotation of the crankshaft with the rotation of the camshaft when the timing belt is unexpectedly damaged.

For this reason, there have so far been proposed a wide variety of power transmission apparatuses one of which is constructed to inform a driver of a belt exchanging time to exchange a deteriorated timing belt with a new timing belt shortly before the timing belt is damaged. One of known power transmission apparatuses is constructed to calculate a fatigue level of an annular power transmission member such as the timing belt on the basis of the rotational speed and the operation time of the engine to issue such a warning that the timing belt is required to be exchanged when the fatigue level exceeds a predetermined threshold value (for example see Patent Document 1).

The power transmission apparatus previously mentioned can appropriately judge whether the timing belt reaches or does not reach the belt exchanging time of the timing belt as compared with the conventional power transmission apparatus constructed to judge the belt exchanging time of the timing belt only based on the travel distance of the vehicle.

Patent Literature

Patent Document 1: Japanese Patent Application Publication No. 2007-239802

SUMMARY OF INVENTION

Solution To Problems

The previously mentioned conventional power transmission apparatus is, however, constructed to calculate the fatigue level of the timing belt based on the rotational speed and the operation time of the engine without directly measuring the real fatigue state of the timing belt to judge the belt exchanging time of the timing belt, so that the calculated fatigue level is not necessarily matched with the real fatigue level, thereby making it impossible to realize an improved high accuracy of judgment as expected for the belt exchanging time.

Even if the power transmission apparatuses are for example operated under the rotational speeds and the operation time of the engine the same as each other, the timing belts of the power transmission apparatuses are different in fatigue level between the power transmission apparatuses frequently operated under a high load and frequently operated under a low load. For this reason, considering the case that the real fatigue level of the timing belt is higher than the fatigue level of the timing belt calculated based on the rotational speed of the operation time of the power transmission apparatus, it is necessary that the warning be issued with a safety ratio set to be at a larger level.

The warning is sometimes issued for the timing belt to be required to be exchanged irrespective of the real fatigue of the timing belt being at a small level, thereby causing such a problem that the timing belt not to necessarily be exchanged is wastefully exchanged with a new timing belt. It is therefore expected to develop a power transmission apparatus which can detect the deterioration state of the timing belt to judge whether the timing belt reaches or does not reach the belt exchanging time based on the deterioration state of the timing belt.

The problem for the judgment accuracy to be not high in the belt exchanging time is not limited to the timing belt. It is therefore assumed for a similar problem to the foregoing problem to be arisen about the overall of the power transmission apparatus for transmitting the power from the drive pulley to the driven pulley by the timing belt having the drive pulley and the driven pulley wound therearound.

It is therefore an object of the present invention to provide a power transmission apparatus which can solve the problems encountered by the conventional power transmission apparatus, and thus can detect the deterioration state of the timing belt in use, thereby making it possible to highly accurately detect whether the timing belt reaches or does not reach the belt exchanging time when the timing belt is required to be exchanged with a new timing belt.

To achieve the object as previously mentioned, the power transmission apparatus according to the present invention comprises a drive pulley supported on a drive shaft, a driven pulley supported on a driven shaft, a power transmission belt wound around the drive pulley and the driven pulley and containing a stress light emission material to emit light in response to an external force exerted thereon, an optical sensor disposed in face-to-face relationship with the power transmission belt to measure the light emitted by the power transmission belt, and an exchange judgment unit that judges whether or not the power transmission belt is deteriorated based on the measured value of the light detected by the optical sensor, and judges that a belt exchanging time is reached with the judgment indicating that the power transmission belt is deteriorated.

By the construction as set forth in the above, the power transmission apparatus can allow the timing belt to emit light when the timing belt is exerted thereon with an external force due to the stress light emission material contained in the timing belt. The light emission amount of the timing belt is varied in response to the stress (Pa) and the elongation speed (mm/min) caused in the timing belt. Here, the light emission amount includes for example light intensity (1 m·s), illumination brightness (cd·m$^2$), illuminance (1×), and luminous intensity (cd).

Here, the stress light emission material is constituted by a luminescent material which is capable of being excited to emit light in a visible light region by small external forces such as for example friction, impact, compression, tension and the like in an elastic deformation region. The timing belt containing the light emission material has a stress emission intensity value proportional to the product of the stress of the timing belt and the elongation speed of the timing belt.

The power transmission apparatus according to the present invention is operative to have the optical sensor detect the light emission of the timing belt and to have the exchanging time judgment unit judge whether or not the timing belt is deteriorated based on the light emission level detected by the optical sensor. The timing belt is judged to reach the exchanging time when the exchanging time judgment unit judges that the timing belt is deteriorated. The deterioration state of the timing belt can therefore be directly detected by the measuring the light emitted from the timing belt, and is therefore different from the deterioration state of the timing belt as seen in the convention power transmission apparatus, thereby making it possible to judge the exchanging time of the timing belt at an accuracy higher than that of the conventional power transmission apparatus which is constructed to judge the exchanging time of the timing belt based on the rotational speed of the drive shaft and the operation time without detecting the deterioration state of the timing belt.

The exchange judgment unit may preferably comprise a deterioration-exchange judgment section adapted to judge that the power transmission belt is deteriorated with the belt exchanging time reached at least one of the times when the measured value of the light exceeds a predetermined light emission threshold value and when the measured value of the light is varied in a predetermined light emission pattern.

By the construction as set forth in the above, the power transmission apparatus can allow the deterioration-exchange judgment section to judge that the power transmission belt is deteriorated with the belt exchanging time reached at least one of the times when the measured value of the light exceeds a predetermined light emission threshold value and when the measured value of the light is varied in a predetermined light emission pattern. This construction of the power transmission apparatus can directly judge whether the power transmission belt reaches or does not reach the exchanging time based on the light emission amount and the light emission pattern of the power transmission belt. This means that the power transmission apparatus can be operated in a simple process and can judge whether the power transmission belt reaches or does not reach the exchanging time.

Here, the light emission amount of the power transmission belt is in general increased when the power transmission belt is deteriorated resulting from the various reasons. The power transmission belt used for a long time for example is easy to be elongated within a resiliently deformable range. In this case, the power transmission belt is increased in elongation speed even with the stress of the power transmission belt being constant, so that the light emission amount of the power transmission belt caused by the elongation of the power transmission belt is increased. Further, the power transmission belt made thin or otherwise slender due to the wear and defect of the power transmission belt is increased in stress even if almost not elongated. The increased stress of the power transmission belt causes the light emission amount of the power transmission belt to be increased.

Alternatively, the power transmission belt having a toothed surface, and constituted by a base material such as a rubber and other resilient materials each containing a stress light emission material, and a tooth cloth provided on the toothed surface is increased in light emission amount, resulting from the fact that the light emitted from the base material is hardly attenuated by the tooth cloth and thus sufficiently passes through the tooth cloth.

Further, the power transmission belt tends to emit light in a specific light emission pattern if the power transmission belt is deteriorated due to various reasons. For example, if the power transmission belt having a toothed surface, and constituted by a base material such as a rubber and other resilient materials each containing a stress light emission material, and a tooth cloth provided on the toothed surface is used for a long time, the power transmission belt is liable to be deteriorated with its tooth bottom being elongated or cracked, thereby causing the teeth of the power transmission belt to be put on the verge of being separated from the power transmission belt, and thus causing the tooth cloth to sometimes be cracked. The tooth cloth cracked leads to the fact that the light emitted from the base material is leaked through the crack of the tooth cloth, thereby producing the specific light emission pattern with the measured value of the light locally and periodically raised for every rotation of the power transmission belt.

In the power transmission apparatus as set forth in the above, the power transmission belt is preferably constituted by a toothed belt having a tooth surface and a tooth cloth provided on the tooth surface, the optical sensor is disposed in face-to-face relationship with the tooth cloth of the toothed belt, and the deterioration-exchange judgment section comprises a setting subsection, an increased light determination subsection, a pattern determination subsection, and an exchange judgment subsection, the setting subsection being adapted to set an average measured value of the light based on the measured value of the light detected by the optical sensor at the initial stage of the power transmission belt wound around the drive pulley and the driven pulley and to set the predetermined light emission threshold value with a predetermined value being added to the average measured value of the light, the increased light determination subsection being adapted to judge that the power transmission belt is deteriorated when the measured value of the light exceeds the predetermined light emission threshold value, the pattern determination subsection being adapted to judge that the tooth cloth is cracked at a specific portion of the power transmission belt and that the power transmission belt is deteriorated when the measured value of the light at a specific portion of the power transmission belt is periodically peaked and when the measured value of the light is varied in the light emission pattern, and the exchange judgment subsection being adapted to judge that the power transmission belt reaches the belt exchanging time when at least one of the increased light determination subsection and the pattern determination subsection judges that the power transmission belt is deteriorated.

By the construction as set forth in the above, the setting subsection is adapted to set an average measured value of the illumination brightness based on the measured value of the illumination brightness detected by the optical sensor and to set the predetermined light emission threshold value with a predetermined value being added to the average measured value of the illumination brightness.

The increased light determination subsection is adapted to judge whether the measured value of the light in the operation time of the power transmission apparatus exceeds or does not exceed the predetermined light emission threshold value, and judges that the power transmission belt is deteriorated when the measured value of the light exceeds the predetermined light emission threshold value.

The pattern determination subsection is adapted to judge a predetermined light emission pattern, viz., judges whether or not the measured value of the light at a specific portion of the power transmission belt is periodically peaked to detect the predetermined light emission pattern. Here, the expression "periodically peaked" is intended to mean that there is a pulse wave form peaked at the same portion for every rotation of the power transmission belt (see FIG. 6). The pattern determination subsection is adapted to judge that the tooth cloth is cracked at the specific portion of the power transmission belt to determine that the power transmission belt is deteriorated when the illumination brightness is periodically peaked with respect to the average illumination brightness.

The exchange judgment subsection is adapted to judge that the power transmission belt reaches the belt exchanging time when at least one of the increased light determination subsection and the pattern determination subsection judges that the power transmission belt is deteriorated.

It will therefore be understood that the power transmission apparatus has a small light emission amount when assembled with a new power transmission belt. This means that the light emission amount of the power transmission belt is increased as a whole in response to the long use of power transmission belt resulting in the fact that the power transmission belt is worn or made slender as a whole due to the advanced deterioration of the power transmission belt. The increased light emission amount of the power transmission belt can be determined by the increased light determination subsection which is adapted to determine whether or not the power transmission belt is deteriorated. The teeth partly on the verge of being separated from the power transmission belt in response to the advanced deterioration of the power transmission belt cause the light emission pattern of the power transmission belt to periodically be peaked. The periodically peaked light emission pattern can be determined by the pattern determination subsection.

The power transmission apparatus as set forth in the above can detect the deterioration of the power transmission belt at a relatively high accuracy level due to the fact that the power transmission apparatus is constructed to have the deterioration of the power transmission belt detected by methods different depending upon the deterioration state of the power transmission belt.

The power transmission apparatus as set forth in the above may preferably further comprise a tensioner disposed between the drive pulley and the driven pulley, the tensioner being adapted to press the power transmission belt from the back side portion of the power transmission belt. The optical sensor is disposed at a position facing the portion of the power transmission belt immediately after the portion of the power transmission belt passes through the tensioner.

By the construction as set forth in the above, the power transmission apparatus can allow the optical sensor to detect the light emission amount immediately after the power transmission belt is pressed by the tensioner from the back side portion of the power transmission belt. The light emission amount can therefore be detected when the stress is increased, thereby making it possible to enhance the detection accuracy to the variation of the light emission of the power transmission belt.

The power transmission apparatus as set forth in the above preferably further comprises a cover adapted to entirely cover the power transmission belt and shield the light, the cover comprising an optical sensor holding portion and a light shield portion, the optical sensor holding portion being adapted to hold the optical sensor in a face-to-face relationship with the power transmission belt, the light shield portion configured to surround at least part of a periphery of the optical sensor holding portion excluding a region of an optical path from the power transmission belt to the optical sensor.

By the construction as set forth in the above, the power transmission apparatus can allow the optical sensor to be retained by the optical sensor holding portion, so that the optical sensor is moved in response to the movement of the cover even if the cover is deformed by the heat of the engine body. For this reason, the relative positions of the optical sensor and the light shielding portion are almost unchanged. The deformation of the cover causes a gap to be formed between the engine body and the cover, so that the optical sensor shielded by the light shielding portion can suppress the detection accuracy of the light emission amount of the power transmission belt from being lowered even if the external light enter the inside of the cover through the gap.

Preferably in the power transmission apparatus as set forth in the above, the drive shaft may be constituted by a crankshaft of an internal combustion engine, the driven shaft may be constituted by a camshaft of the internal combustion engine, and the power transmission belt may be constituted by a timing belt.

By the construction as set forth in the above, the power transmission apparatus can judge at a high accuracy whether the timing belt of the internal combustion engine reaches or does not reach the exchanging time.

Advantageous Effects of Invention

The power transmission apparatus according to the present invention is constructed to have a timing belt containing a stress light emission material and to judge the belt exchanging time of the timing belt based on the light emission amount of the timing belt, so that the power transmission apparatus can detect the deterioration state of the timing belt in use and can highly accurately judge whether or not the belt exchanging time of the timing belt is reached.

DESCRIPTION OF EMBODIMENTS

The embodiment of the power transmission apparatus according to the present invention will hereinafter be described with reference to the accompanying drawings. The present embodiment is shown as an example in which the power transmission apparatus is applied to an automotive vehicle.

First, explanation will be made about the construction of the power transmission apparatus 1 according to the present embodiment. The power transmission apparatus according to the present embodiment is exemplified as being mounted on an automotive vehicle 2.

Figure 1:
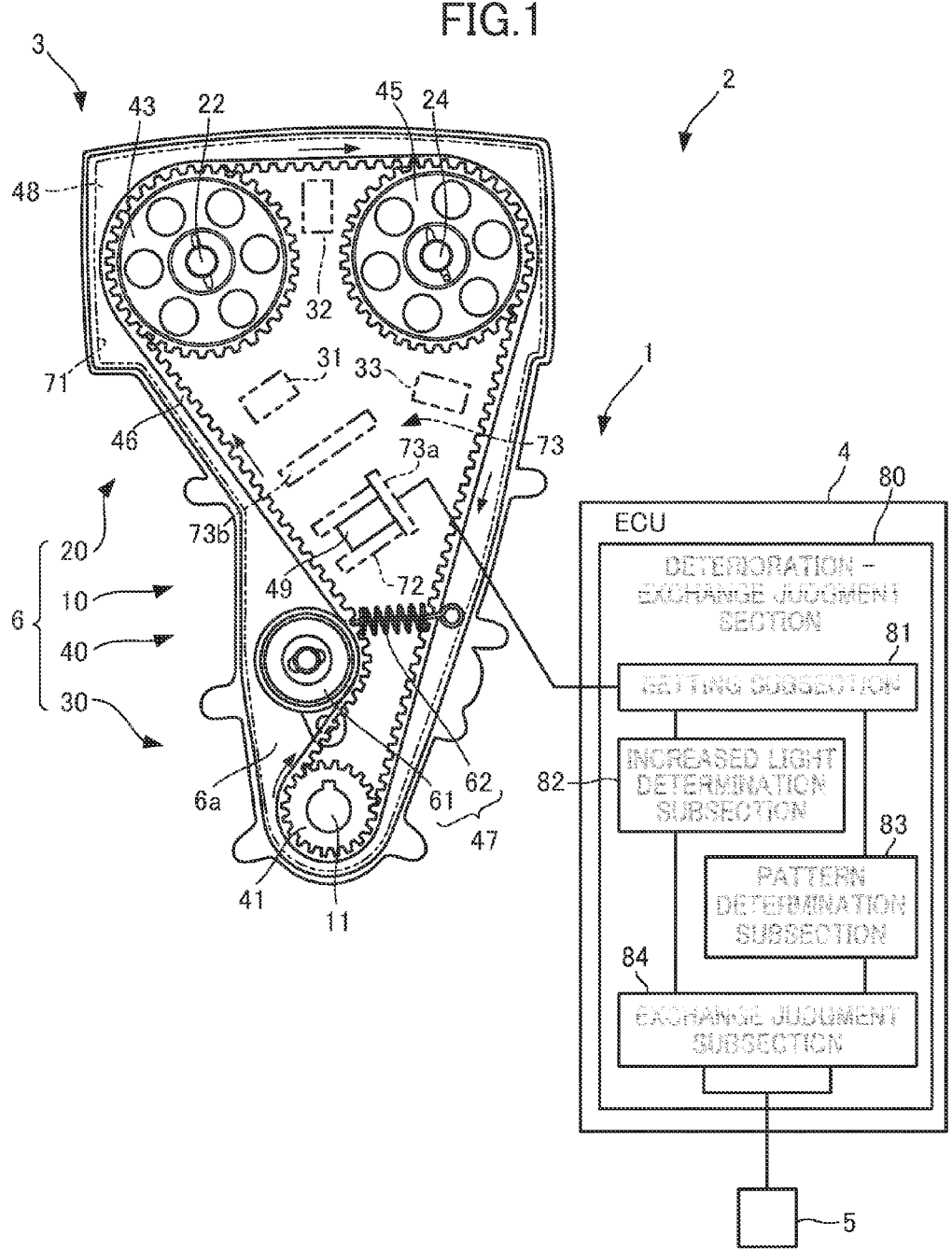
FIG. 1 is a schematic front view showing a power transmission apparatus according to the embodiment of the present invention.

As shown in FIG. 1, the vehicle 2 is provided with an engine 3 constituting an internal combustion engine, an electronic control unit 4 (hereinafter simply referred to as a "ECU") constituting a belt exchanging time judgment unit, and a warning device 5.

Figure 2:
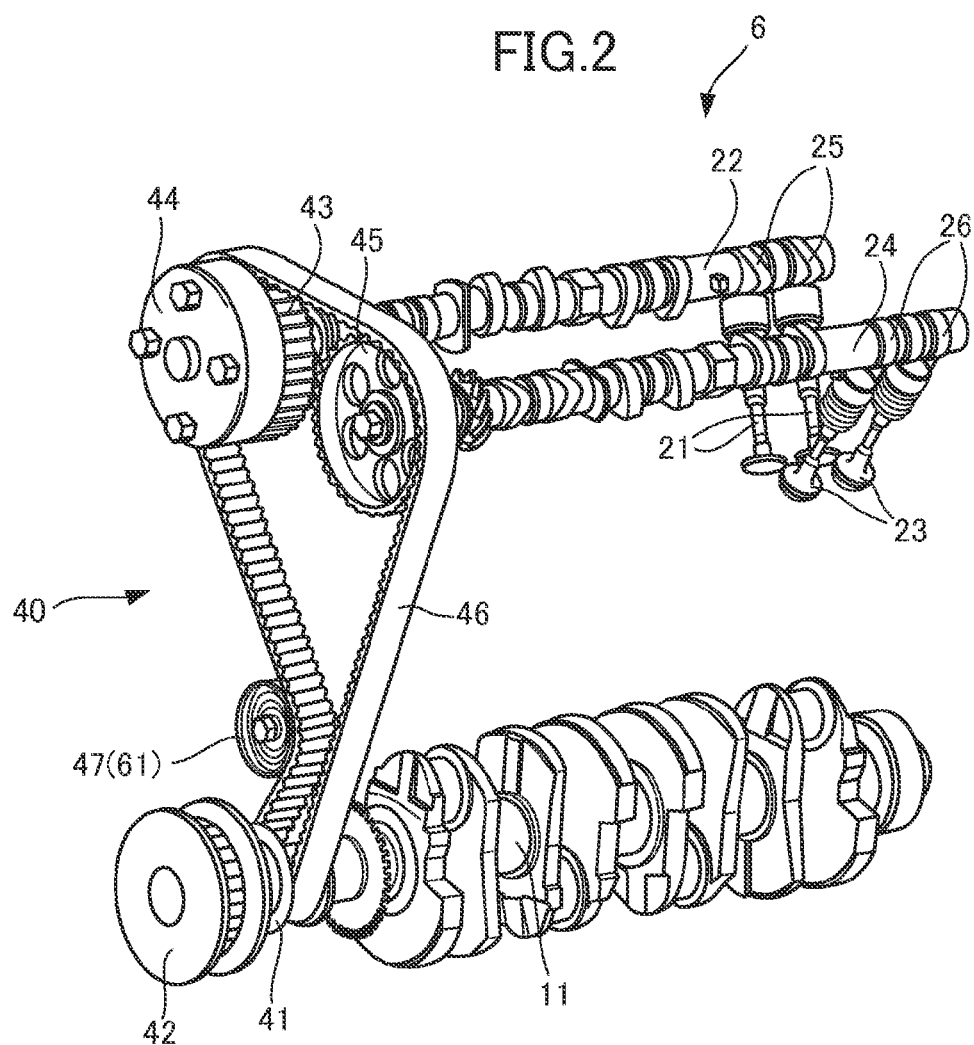
FIG. 2 is a schematic perspective view showing the power transmission apparatus according to the embodiment of the present invention which comprises a crankshaft and a camshaft each forming part of an engine, and a power transmission mechanism.

As shown in FIGS. 1, 2, the engine 3 is constituted by a four-cycle gasoline engine capable of performing a series of four strokes consisting of an intake stroke, a compression stroke, an expansion stroke, an exhaust stroke during two reciprocation motions of a piston.

The engine 3 adopts a straight four-cylinder gasoline engine. The engine 3 is provided with an engine body 6, an intake device, not shown, for supplying fuel burning air to the engine body 6, and an exhaust device, also not shown, for discharging exhaust gas from the engine body 6 to the outside. The engine body 6 is provided with a cylinder block 10, a cylinder head 20 secured to the upper portion of the cylinder block 10, an oil reservoir 30 secured to the lower portion of the cylinder block 10, and a power transmission mechanism 40 provided in the vicinity of the front surface 6a of the cylinder block 10, the cylinder head 20, and the oil reservoir 30 (the front surface is hereinafter simply referred to as "an engine block front end surface").

The cylinder block 10 is provided with pistons not shown, connecting rods also not shown, and a crankshaft 11 constituting a drive shaft. The pistons are provided in the cylinder block 10 to be reciprocally movable upwardly and downwardly with respect to the cylinder block 10. Each of the pistons is drivably connected with the connecting rod which is in turn drivably connected with the crankshaft 11, so that the crankshaft can be rotated in response to the upward and downward motions of the pistons through the connecting rods.

The engine body 6 is formed with combustion chambers not shown. Each of the combustion chambers is formed by the cylinder block 10, the cylinder head 20, and the piston. The engine 3 is operative to reciprocate the piston by burning fuel and air mixture in the combustion chamber at a desired timing and to rotate the crankshaft 11 by way of the connecting rod.

The cylinder head 20 is provided with an intake port, not shown, having the combustion chamber held in communication with the intake passage forming part of the intake device, intake valves 21 adapted to close and open the intake ports, respectively, an intake camshaft 22 constituting a driven shaft, i.e., a camshaft for operating the intake valves 21, an exhaust port, not shown, having the combustion chamber held in communication with the exhaust device, an exhaust valve 23 for opening and closing the exhaust port, and an exhaust camshaft 24 constituting a driven shaft, i.e., a camshaft for operating the exhaust valves 23.

The intake camshaft 22 is provided with intake cams 25, and is rotatable with respect to the cylinder head 20. Each of the intake cams 25 is held in engagement with the upper ends of the intake valves 21. In response to the rotation of the intake cam shaft 22, each of the intake cams 25 is rotated to have the intake valves 21 moved upwardly and downwardly. The intake valves 21 moved upwardly and downwardly can open and close the spaces between the intake port and the combustion chamber, so that the engine can be operated to control the fuel burning air to be introduced into the combustion chamber by the intake device.

The exhaust camshaft 24 is provided with exhaust cams 26, and is rotatable with respect to the cylinder head 20. Each of the exhaust cams 26 is held in engagement with the upper ends of the exhaust valves 23. In response to the rotation of the exhaust cam shaft 24, each of the exhaust cams 26 is rotated to have the exhaust valves 23 moved upwardly and downwardly. The exhaust valves 23 moved upwardly and downwardly can open and close the space between the combustion chamber and the exhaust port, so that the engine can be operated to control the exhaust gas to be discharged from the combustion chamber to the exhaust device.

Figure 3:
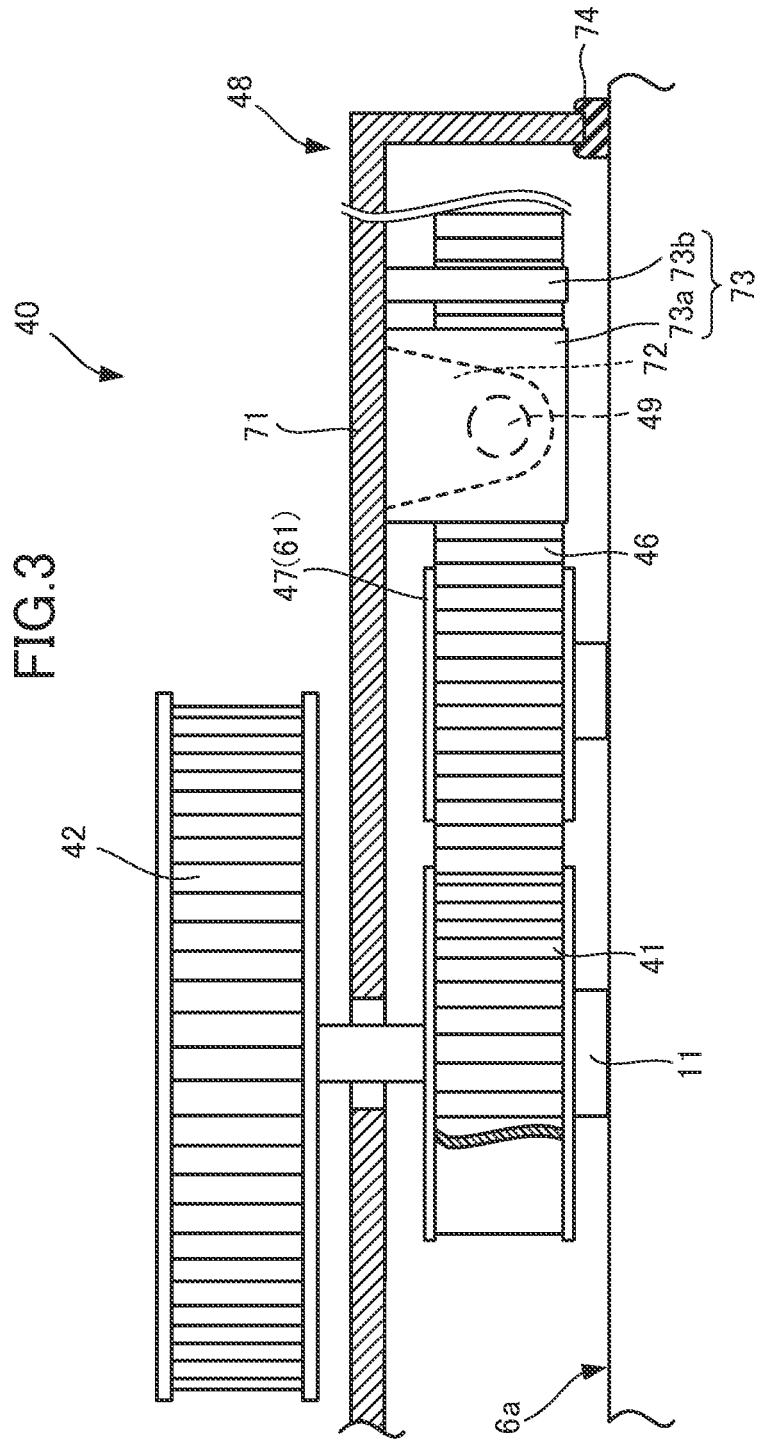
FIG. 3 is a schematic side view showing the power transmission apparatus according to the embodiment of the present invention which comprises a cover fragmentally cross-sectioned.

As shown in FIGS. 1 to 3, the power transmission mechanism 40 is provided with a crankshaft pulley 41 and an auxiliary pulley 42 constituting drive pulleys, respectively, an intake camshaft pulley 43 and a variable rotational phase difference actuator 44 constituting driven pulleys, respectively, an exhaust camshaft pulley 45 constituting a driven pulley, a timing belt 46 constituting a power transmission belt, a tensioner 47, a cover 48, and an optical sensor 49.

The crankshaft pulley 41 and the auxiliary pulley 42 are supported on the front end portion of the crankshaft 11. The crankshaft pulley 41 is disposed inside of the cover 48, while the auxiliary pulley 42 is disposed outside of the cover 48.

The intake camshaft pulley 43 and the variable rotational phase difference actuator 44 are supported on the front end portion of the intake camshaft 22. The variable rotational phase difference actuator 44 is adapted to rotate the intake camshaft 22 to produce the rotational phase difference with respect to the intake camshaft 43. The variable rotational phase difference actuator 44 is adapted to adjust the rotational phase difference between the crankshaft 11 and the intake camshaft 22 depending upon the operational condition. FIG. 1 shows an exposed state of the intake camshaft 43 with the variable rotational phase difference actuator 44 being removed.

The exhaust camshaft pulley 45 is supported on the front end portion of the exhaust camshaft 24.

The timing belt 46 is wound around the crankshaft pulley 41, the intake camshaft pulley 43, and the exhaust camshaft pulley 45. The rotation of the crankshaft pulley 41 is therefore transmitted to the intake camshaft pulley 43 and the exhaust camshaft pulley 45 by the timing belt 46.

The rotation of the crankshaft 11 is transmitted to the intake valves 21 through the crankshaft pulley 41, the timing belt 46, the intake camshaft pulley 43, the intake cam shaft 22, and the intake cams 25 to open and close the intake ports.

Simultaneously with the transmission of the rotation of the crankshaft pulley 41, the rotation of the crankshaft 11 is transmitted to the exhaust valves 23 through the crankshaft pulley 41, the timing belt 46, the exhaust camshaft pulley 45, the exhaust camshaft 24, and the exhaust cams 26 to open and close the exhaust ports.

Figure 4:
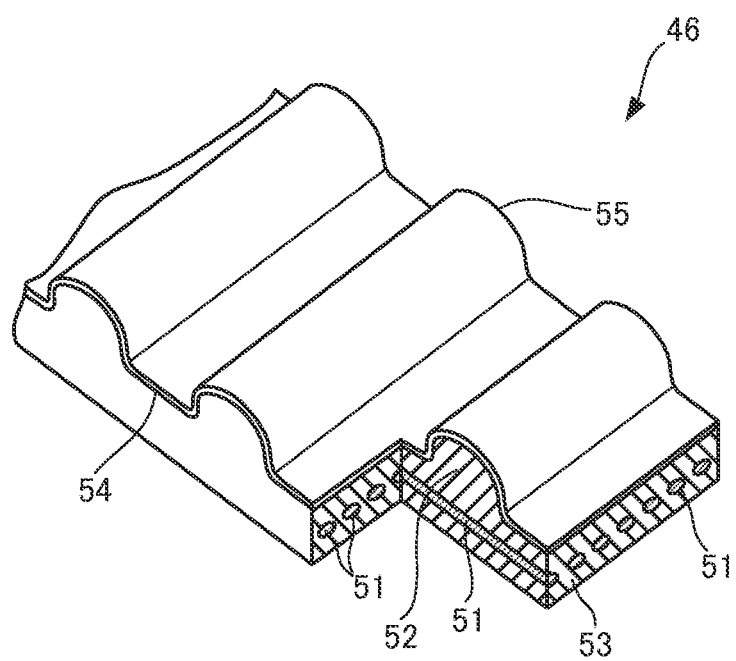
FIG. 4 is a perspective view showing a timing belt forming part of the power transmission apparatus according to the embodiment of the present invention and partly fragmentally cross-sectioned.

As shown in FIG. 4, the timing belt 46 is constituted by a toothed belt made of rubber, and is provided with core wires 51 each constituting a core material, a tooth side rubber 52 forming a tooth side portion, a back side rubber 53 forming a back side portion, and a tooth cloth 54 provided on, viz., attached to the tooth surface of the tooth side rubber 52. The tooth cloth 54 is made of aramid fiber and nylon.

The tooth 55 is formed with tooth side rubber 52. Each of the tooth side rubber 52 and the back side rubber 53 contains a stress light emission material which is capable of emitting light when an external force is exerted on the stress light emission material.

Here, as one of the stress light emission materials is used an europium doped strontium aluminate (SAOE) showing a light emission green (wavelength of 500 nm to 600 nm). The SAOE powdered is contained in the tooth side rubber 52 and the back side rubber 53.

As shown in FIG. 1, the tensioner 47 is disposed between the crankshaft pulley 41 and the intake camshaft pulley 43 to press and thus resiliently urge the timing belt 46 from the back side of the timing belt 46. The tensioner 47 is provided with a tension roller 61 and a tension spring 62.

The tension spring 62 is adapted to impart the tension roller 61 an urging force to press the timing belt 46. The tension roller 61 is adapted to press the timing belt 46 from the back side of the timing belt 46 to impart an appropriate tension to the timing belt 46. The pressing action of the tension roller 61, therefore, can prevent the timing belt 46 from being relaxed and released from the intake camshaft pulley 43, the exhaust camshaft pulley 45, and the crankshaft pulley 41.

The timing belt 46 is rotated in a rotational direction shown by arrows in FIG. 1 from the crankshaft pulley 41 to the crankshaft pulley 41 through the tensioner 47, the intake camshaft pulley 43, and the exhaust camshaft pulley 45.

As shown in FIGS. 1, 3, the cover 48 is provided in contact with the engine block front end surface 6a of the engine body 6 to cover the overall of the timing belt 46, thereby shielding the timing belt 46 from external light. The cover 48 is made of plastic with no transparent property, and is provided with a cover body 71, an optical sensor retaining member 72 for retaining the optical sensor 49, a light shielding device 73 provided in the vicinity of the optical sensor retaining member 72, and a gasket 74.

The cover body 71 has a peripheral edge held in contact with the engine block front end surface 6a through the basket 74. This construction makes it impossible for the external light to enter the inner side of the cover 48 from between the peripheral edge of the cover body 71 and the engine block front end surface 6a.

The gasket 74 is pressed toward the engine block front end surface 6a from the peripheral edge of the cover body 71. This construction makes it possible for the gasket 74 to be resiliently deformed even if the cover body 71 is thermally deformed to have the peripheral edge of the cover body 71 somewhat spaced from the engine block front end surface 6a, thereby preventing the gap between the peripheral edge of the cover body 71 and the engine block front end surface 6a from being produced.

The optical sensor retaining member 72 is provided in face-to-face relationship with the tooth side portion of the timing belt 46 positioned immediately after passing through the tensioner 47. The optical sensor retaining member 72 is in a cylindrical shape, and has a bottom portion having the optical sensor 49 received therein and retained thereby. The optical sensor retaining member 72 retains the optical sensor 49 having a detection direction toward the tooth side portion of the timing belt 46.

The light shielding device 73 is provided to surround at least one part of the periphery of the optical sensor retaining member 72 excluding the region of the optical path to the optical sensor 49 from the timing belt 46. The light shielding device 73 is provided with a back plate 73a provided on the back side portion of the optical sensor 49, and a side plate 73b provided between the optical sensor 49 and the intake camshaft pulley 43.

The optical sensor 49 is made of a photodiode. The optical sensor 49 is adapted to detect the illumination brightness ($cd \cdot m^{-2}$) of the tooth side portion of the timing belt 46 as a light emission amount. The photodiode has a "pn" junction or a pin structure. The "pn" junction or the pin structure incident with photon having sufficient energy causes electron to be excited to generate electric current (A). The electric current is inputted to an ECU 4 which will be described hereinafter. The light emitted from the timing belt 46 is processed as electric current in the ECU 4.

The ECU 4 is provided with a CPU (Central Processing Unit) as a central processing unit, a ROM (Read Only Memory) for storing therein fixed data, a RAM (Random Access Memory) for temporarily storing data therein, an EEPROM (Electrically Erasable and Programmable Read Only Memory) made of a rewritable non-volatile memory, and an input and output interface circuit.

The ECU 4 is connected with various kinds of sensors including the optical sensor 49, a crank sensor not shown and the like. The ROM of the ECU 4 is adapted to memorize programs and data such as an exchange judgment program of the timing belt 46 and the like required to make various kinds of judgments.

The crank position sensor is adapted to detect the rotational speed (rpm) of the crankshaft 11 to output a signal indicative of the detected rotational speed to the ECU 4. The ECU 4 is adapted to calculate the rotational speed (n) revolutions=Nc×T×(Tp/Tb) of the timing belt 46 from the tooth number Tp of the crankshaft pulley 41, the tooth number Tb of the timing belt 46, the rotational speed Nc (rpm) of the crankshaft 11 indicated by the detected signal outputted from the crank position sensor, and the measurement time T(min). The tooth number Tp of the crankshaft pulley 41 and the tooth number Tp of the timing belt 46 are preliminarily set.

The ECU 4 has a deterioration-exchange judgment section 80. The deterioration-exchange judgment section 80 is operative to judge that the timing belt 46 is deteriorated and the belt exchanging time is reached at least one of the times when the illumination brightness of the timing belt 46 exceeds a predetermined light emission threshold value 87 and when the illumination brightness of the timing belt 46 is varied with a predetermined light emission pattern. The deterioration-exchange judgment section 80 has a setting subsection 81, an increased light determination subsection 82, a pattern determination subsection 83, and an exchange judgment subsection 84.

Figure 6:
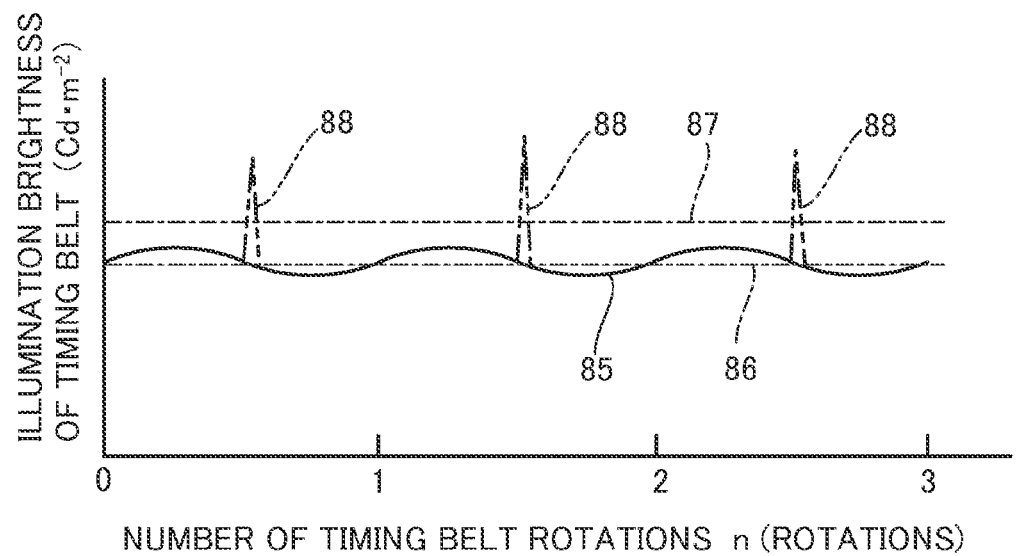
FIG. 6 is a graph showing the relationship between the rotational speed (n) and the illumination brightness of the timing belt of the power transmission apparatus according to the embodiment of the present invention.

As shown in FIG. 6, the setting subsection 81 is operative to set an average measured value of the light 86 based on the measured value of the light 85 of the illumination brightness detected by the optical sensor 49 when the timing belt 46 is initially assembled in the apparatus, and to set a light emission threshold value 87 after a predetermined illumination brightness value experimentally defined is added to the average measured value of the light 86.

The increased light determination subsection 82 is operative to determine that the timing belt 46 is deteriorated when the light emission value 85 of the timing belt 46 exceeds the light emission threshold value 87.

The pattern determination subsection 83 is operative to determine that the tooth cloth 54 is cracked at the specific portion of the timing belt 46, and to determine that the timing belt 46 is deteriorated in consideration of the fact that the illumination brightness of the timing belt 46 is varied in a predetermined light emission pattern. Here, the light emission pattern has the measured value of the lights 85 peaked at the specific portion of the timing belt 46, and thus has the pulse wave forms 88 periodically peaked every one turn of the timing belt 46.

The exchange judgment subsection 84 is operative to judge that the timing belt 46 reaches the belt exchanging time when the timing belt 46 is deteriorated by at least one of the increased light determination subsection 82 and the pattern determination subsection 83.

The warning device 5 is connected with the ECU 4, and thus adapted to warn the driver that the timing belt 46 is required to be exchanged with a new timing belt 46 when the exchange judgment subsection 84 judges that the timing belt 46 reaches the belt exchanging time. The warning device 5 may be constituted by a warning lamp and a warning buzzer either one of which is adopted to be installed in the passenger room near a driver seat for example.

Here, the crankshaft pulley 41, the intake camshaft pulley 43, the exhaust camshaft pulley 45, the timing belt 46, the cover 48, the optical sensor 49, and the ECU 4 assembled in the present embodiment constitute as a whole a power transmission apparatus according to the present invention.

Next, the operation of the power transmission apparatus according to the present embodiment will hereinafter be described with reference to the flow chart shown in FIG. 5.

Figure 5:
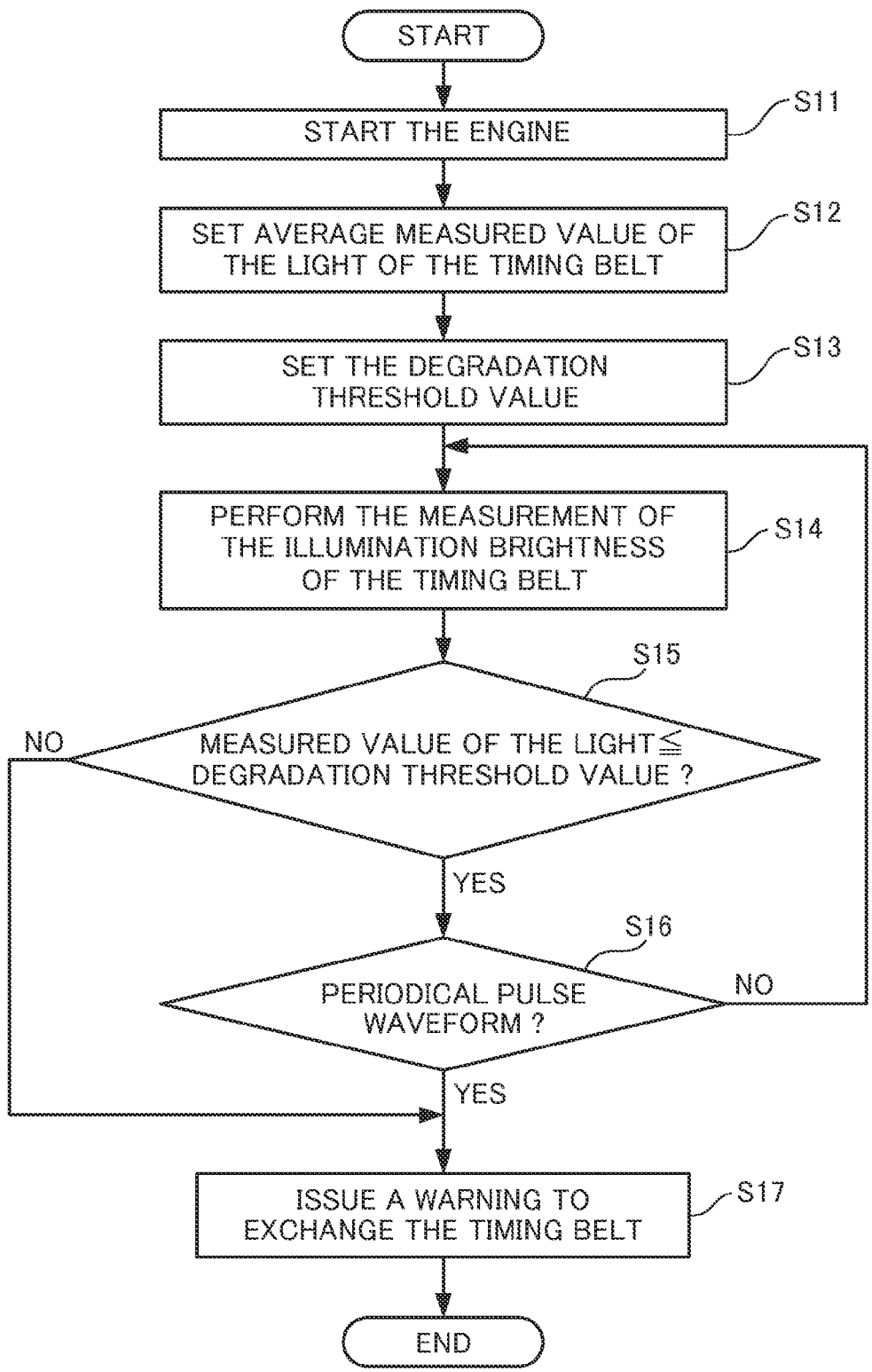
FIG. 5 is a flow chart showing a process to judge whether or not the timing belt reaches or does not reach a belt exchanging time based on the deteriorated state of the timing belt of the power transmission apparatus according to the embodiment of the present invention.

The flow chart shown in FIG. 5 indicates an execution content of the exchange judgment program of the timing belt 46 to be executed in the work area of the RAM by the CPU of the ECU 4. This process is to be executed at predetermined time intervals between the "ON" and "OFF" of the ignition switch.

The time intervals are set to appropriately be selected depending upon the kinds of models, the setting specifications of the engine 3 and the timing belt 46. There is a possibility that the accuracy of judgment is decreased for the time intervals extremely long, while the process becomes complicated for the time intervals extremely short, so that the time intervals are required to appropriately be set in view of these conditions.

The timing belt 46 is rotated in response to the rotation of the crankshaft 11 when the engine 3 is started for the first time after the mounting of the timing belt 46 on the apparatus (Step S11). The rotation of the crankshaft 11 causes the timing belt 46 to have tension acted thereto. This tension causes stress to be generated in the timing belt 46. This stress causes an external force to be exerted on the stress light emission material contained in the tooth side rubber 52 and the back side rubber 53 of the timing belt 46, thereby resulting in having the stress light emission material emit light.

The light emitted from the tooth side rubber 52 and the back side rubber 53 of the timing belt 46 passes through the tooth cloth 54 while lowering the illumination brightness. The light passing through the tooth cloth 54 is received by the optical sensor 49, and thereafter converted into a signal indicated by an electrical current (A). The electric signal from the optical sensor 49 is inputted to the ECU 4. In the following description of the flowchart, the various processes for the measured value of the lights are actually to be performed by the ECU 4 with the electric current passing therethrough.

The illumination brightness values of the timing belt 46 slightly differ depending on the portions and positions of the timing belt 46 different from one another in the density of the light emission material. Therefore, the measured value of the light 85 of the illumination brightness of the timing belt 46 is fluctuated in the form of a periodic wave for every rotation of the timing belt 46 for example as shown in FIG. 6.

As shown in FIGS. 5 and 6, the ECU 4 is operated for the setting subsection 81 to calculate an average value of the measured value of the lights 85 of the illumination brightness of the timing belt 46, and to set the same as an average measured value of the light 86 (Step S12).

The ECU 4 is operated for the setting subsection 81 to add a predetermined illumination brightness value to the average measured value of the light 86 of the measured value of the light 85, and to set a degradation threshold value 87 (Step S13). The degradation threshold value 87 is indicative of such a value that a timing belt 46 is deteriorated to the extent that an exchanging warning is required to be issued if the measured value of the light 85 of the illumination brightness of the timing belt 46 exceeds the degradation threshold value 87.

The step S12 and step S13 described above are indicative of processes to be performed only once after the timing belt 46 is mounted on the apparatus. The step S12 and step S13 are therefore to be skipped until after the timing belt 46 is exchanged even if the engine 3 is restarted to be operated.

During the operation of the engine 3, the optical sensor 49 and the ECU 4 are always operated to perform the measurement of the illumination brightness of the timing belt 46 (Step S14).

Here, the timing belt 46 used for a long time may sometimes cause the timing belt 46, for example, to easily be elongated under a normal tension exerted thereon, or otherwise to become thin or slender even if not elongated to generate a relatively large stress in the timing belt 46. Under these conditions, the light emission amount of the timing belt 46 is larger than the light emission amount before use for a long time of the timing belt 46.

Alternatively, the tooth cloth 54 becomes worn and thus thin by the long-term use of the timing belt 46, so that the light emitted from the tooth side rubber 52 and the back side rubber 53 passes though the tooth cloth 54, thereby increasing the light emission amount of the timing belt 46. For this reason, it is desirably required to determine whether or not the measured value of the light 85 of the illumination brightness exceeds the degradation threshold value 87 in order to detect the deterioration level of the timing belt 46.

Therefore, the ECU 4 is operated for the increased light determination subsection 82 to determine whether or not the measured value of the light 85 of the illumination brightness of the timing belt 46 is smaller than the degradation threshold value 87 (Step S15). When the increased light determination subsection 82 determines that the measured value of the light 85 of the illumination brightness of the timing belt 46 at least partly exceeds the degradation threshold value 87 ("NO" in Step S15), the ECU 4 determines that the timing belt 46 has been deteriorated.

The fact that the increased light determination subsection 82 of the ECU 4 determines that the timing belt 46 has been deteriorated leads to the fact that the ECU 4 determines that the timing belt 46 reaches the belt exchanging time. This causes the warning device 5 to issue a warning to recommend the exchange of the timing belt 46 (Step 17).

Further, there is a possibility that the long-term use of the timing belt 46 causes the bottom of the tooth 55 of the tooth side rubber 52 to be elongated or otherwise cracked, thereby putting the tooth 55 on the verge of being separated from the timing belt 46, and resulting in the tooth cloth 54 being sometimes cracked. The cracked tooth cloth 54 causes the illumination brightness of the timing belt 46 to be locally and periodically raised for every rotation of the timing belt 46 at the cracked tooth cloth 54, and to generate the pulse wave forms 88 in the illumination brightness of the timing belt 46. For this reason, it is desirable that the pulse wave forms 88 periodically peaked in the illumination brightness of the timing belt 46 be detected in order to detect the deterioration level of the timing belt 46.

When the ECU 4 judges that the entire area of the measured value of the light 85 of the illumination brightness is the degraded threshold 87 or less ("YES" in Step S15), the pattern determination subsection 83 is operated to judge whether the measured value of the light 85 of the illumination brightness has or does not have periodical pulse wave forms 88 (Step S16).

When the pattern determination subsection 83 of the ECU 4 judges that the measured value of the light 85 of the illumination brightness has the periodical pulse wave forms 88 ("YES" in Step S16), the ECU 4 determines that the tooth cloth 54 is cracked at the specific portion of the timing belt 46, and that the timing belt 46 is deteriorated.

By the fact that the pattern determination subsection 83 of the ECU 4 determines that the timing belt 46 is deteriorated, the exchange judgment subsection 84 judges that the timing belt 46 reaches the belt exchanging time. This causes the warning device 5 to issue a warning to recommend the exchange of the timing belt 46 (Step S17).

When, on the other hand, the pattern determination subsection 83 of the ECU 4 judges that the measured value of the light 85 of the illumination brightness does not have the periodical pulse wave forms 88 ("NO" in Step S16), the ECU 4 determines that the timing belt 46 is not deteriorated to the extent that the timing belt 46 is required to be exchanged with a new timing belt 46, and allows that the measurement of the illumination brightness of the timing belt 46 is successively performed by the optical sensor 49 and the ECU 4 (Step S14).

From the foregoing description, it will therefore be understood that the power transmission apparatus 1 according to the present embodiment can directly judge whether or not the timing belt 46 reaches the belt exchanging time on the basis of the light emission amount and the light emission pattern of the timing belt 46. For this reason, the power transmission apparatus according to the present embodiment can judge at a relatively high accuracy that the belt exchanging time of the timing belt 46 is required to be exchanged with a new timing belt due to the fact that the state of the timing belt 46 is directly detected, as compared with the conventional power transmission apparatus which is adapted to judge the belt exchanging time of the timing belt 46 based on the rotational speed and operation time of the engine 3 without detecting the state of the timing belt 46.

Further, the pattern determination subsection 83 of the power transmission apparatus according to the present embodiment can detect the cracks of the tooth cloth 54 of the timing belt 46, thereby making it possible to detect the elongation and the cracks of the tooth bottom of the tooth 55, and to preliminarily predict that the teeth of the timing belt 46 are partly broken.

Further, the optical sensor 49 is provided at a position opposing to the tooth side portion of the timing belt 46 immediately after passing through the tensioner 47. Since the timing belt 46 is bent toward its back side portion by the tensioner 47, the tooth 55 of the timing belt 46 is the most likely to be broken at a position immediately after passing through the tensioner 47. Therefore, the illumination brightness is detected at a position where the tooth 55 of the timing belt 46 is the most likely to be broken. For this reason, the power transmission apparatus according to the present embodiment can raise the detection accuracy of the deterioration of the timing belt 46.

The optical sensor 49 is accommodated in the bottom portion of the optical sensor retaining member 72 in a tubular shape, so that the optical sensor 49 can be suppressed from erroneously detecting the external light. Further, the optical sensor 49 has a peripheral portion surrounded by a light shielding device 73, so that the optical sensor 49 can be more reliably suppressed from erroneously detecting the external light.

Further, the optical sensor 49 is retained by the optical sensor retaining member 72 integrated with the cover body 71, so that the optical sensor 49 is moved in response to the movement of the cover 48 even if the cover 48 is deformed by the heat of the engine body 6. For this reason, the relative positions of the optical sensor 49 and the light shielding device 73 are almost unchanged.

The deformation of the cover 48 causes a gap to be formed between the engine block front end surface 6a and the cover 48, so that the optical sensor 49 shielded by the light shielding device 73 can suppress the detection accuracy of the illumination brightness of the timing belt 46 from being lowered even if the external light enters the inside of the cover 48 through the gap.

Further, the power transmission apparatus 1 according to the present embodiment as described above has been explained as being constructed to have the optical sensor 49 provided at a position opposing to the tooth side portion of the timing belt 46 immediately after passing through the tensioner 47 as shown in FIG. 1. However, the power transmission apparatus 1 according to the present invention is not limited to this construction of the power transmission apparatus 1, and for example may be constructed to have an optical sensor 49 disposed at a position other than the position as previously mentioned.

The power transmission apparatus 1 according to the present invention, for example, may be constructed to have an optical sensor 31 provided in the vicinity of the intake camshaft pulley 43 between the tensioner 47 and the intake camshaft pulley 43, or an optical sensor 32 provided between the intake camshaft pulley 43 and the exhaust camshaft pulley 45, or an optical sensor 33 provided between the exhaust camshaft pulley 45 and the crankshaft pulley 41.

Further, the power transmission apparatus 1 according to the present embodiment as described above has been explained as being constructed to have the optical sensor 49 retained by the optical sensor retaining member 72 of the cover 48. However, the power transmission apparatus according to the present invention is not limited to this construction of the power transmission apparatus 1, but for example may be constructed to have the optical sensor 49 secured to the engine block front end surface 6a.

Further, the power transmission apparatus 1 according to the present embodiment as described above has been explained as being constructed to have the optical sensor 49 disposed in face-to-face relationship with the tooth side portion of the timing belt 46. However, the power transmission apparatus according to the present invention is not limited to this construction of the power transmission apparatus 1, and for example may be constructed to have an optical sensor 49 disposed in face-to-face relationship with the back side portion of the timing belt 46.

Further, the power transmission apparatus 1 according to the present embodiment as described above has been explained as being constructed to have the stress light emission material contained in both the tooth side rubber 52 and the back side rubber 53 of the timing belt 46. However, the power transmission apparatus according to the present invention is not limited to this construction of the power transmission apparatus 1, and may be constructed to have a stress light emission material contained in the rubber having a side toward which the optical sensor 49 is directed for detecting the illumination brightness of the timing belt 46.

In other words, it is sufficient if the stress light emission material is contained at least only in the tooth side rubber 52 for the optical sensor 49 to be able to detect the illumination brightness from the tooth side of the timing belt 46. On the other hand, it is sufficient if the stress light emission material is contained at least only in the back side rubber 53 for the optical sensor 49 to be able to detect the illumination brightness from the back side of the timing belt 46.

Further, the power transmission apparatus 1 according to the present embodiment as described above has been explained as being constructed to use the europium doped strontium aluminate as the stress light emission material. However, the power transmission apparatus according to the present invention is not limited to this construction, and the stress light emission material may be replaced by zinc sulfide (ZnS Mn) to be added to the tooth side rubber 52 or the back side rubber 53 of the timing belt 46 with manganese being a central component as a stress light emission material. In this example, the timing belt 46 can emit light in a yellow-orange color.

Further, the power transmission apparatus 1 according to the present embodiment as described above has been explained as being constructed to have the toothed belt constituting the power transmission belt defined in the present invention. However, the power transmission apparatus according to the present embodiment may be constructed to have other types of power transmission belts such as for example a flat belt, a V-belt and the like.

Further, the power transmission apparatus 1 according to the present embodiment as described above has been explained as being constructed to have the gasket 74 between the peripheral edge of the cover body 71 and the engine block front end surface 6a as shown in FIG. 3. However, the power transmission apparatus according to the present invention is not limited to this construction, and may be constructed to have the engine block front end surface 6a and the peripheral edge of the cover body 71 formed to be engageable with each other in the form of what is called a socket and spigot cotter joint structure for example in lieu of the gasket 74.

In previously mentioned construction as an alternative example, the engine block front end surface 6a is for example formed with a groove larger and thus deeper than the thermal deformation amount of the cover body 71 to enable the peripheral edge of the cover body 71 to snugly be received in the bottom portion of the groove. This construction makes it possible to prevent the external light from entering the inside of the cover 48 with the peripheral edge of the cover body 71 being by no means moved out of the groove even if the cover body 71 is thermally deformed.

Further, the power transmission apparatus 1 according to the present embodiment as described above has been explained as being constructed to have the cover 48 provided on the front portion of the engine body 6. However, the power transmission apparatus according to the present invention is not limited to this construction, and can be dispensed with such as the cover 48 for example in the case that the inside of the engine room can sufficiently be shielded from the light, and that the illumination brightness can sufficiently be detected by the optical sensor 49.

Further, the power transmission apparatus 1 according to the present embodiment as described above has been explained as being constructed to have the optical sensor 49 constituted by a photo diode. However, the power transmission apparatus according to the present invention is not limited to this construction, and for example may be constructed to have the optical sensor 49 constituted by other optical sensors operative under a photovoltaic effect. Among the other optical sensors operative under a photovoltaic effect are raised a phototransistor, a photo IC, and a solar cell, and the like for example.

Further, the power transmission apparatus according to the present invention is not limited to having the optical sensors operative under a photovoltaic effect as previously mentioned, however, may be constructed to have an optical sensor utilizing a photoconductive effect such as a CdS (cadmium sulfide) cell, a CdSe (cadmium selenide) cell, a PbS (lead sulfide) cell, and the like, or an optical sensor using a photoemission effect such as a light conduit, a photomultiplier tube (photomultiplier) and the like for example.

Further, the power transmission apparatus 1 according to the present embodiment as described above has been explained as being constructed to have the engine 3 constituted by a straight four-cylinder engine. However, the power transmission apparatus according to the present invention is not limited to this construction, and may be constructed to have an engine selected from among various kinds of engines including for example a straight six-cylinder engine, a V-type six-cylinder engine, a V-type twelve-cylinder engine, and a horizontally opposing six-cylinder engine and the like.

Further, the power transmission apparatus 1 according to the present embodiment as described above has been explained as being constructed to have the engine 3 constituted by an engine to be operated with gasoline as one of the fuels. However, the power transmission apparatus 1 according to the present invention is not limited to this construction, and may be constructed to have an engine to be operated with a hydrocarbon fuel such as light oil, and an alcohol fuel produced by mixing gasoline and alcohol such as ethanol.

Further, the power transmission apparatus 1 according to the present embodiment as described above has been explained as being applied to the engine 3 of the automotive vehicle 2. However, the power transmission apparatus according to the present invention is not limited to this construction, and may be applied to the whole of the power transmission apparatus which comprises a drive pulley and a driven pulley wherein the driving power is transmitted from the drive pulley to the driven pulley by a power transmission belt wound around the drive pulley and the driven pulley.

From the foregoing description, it will be understood that the power transmission apparatus according to the present invention is useful for a suitable power transmission apparatus in general for detecting the time to exchange the power transmission belt wound around the driven pulley and the driving pulley.

EXPLANATION OF REFERENCE NUMERALS

1: power transmission apparatus
2: automotive vehicle
3: engine (internal combustion engine)
4: ECU (exchange judgment unit, degradation-exchange judgment section, setting subsection, increased light determination subsection, pattern determination subsection, exchange judgment subsection, measured value of the light, average measured value of the light, light emission threshold value)
5: warning device
6: engine body
11: crankshaft (drive shaft)
22: intake camshaft (driven shaft, camshaft)
24: exhaust camshaft (driven shaft, camshaft)
31: optical sensor 32: optical sensor
33: optical sensor
41: crankshaft pulley (drive pulley)
43: intake camshaft pulley (driven pulley)
45: exhaust camshaft pulley (driven pulley)
46: timing belt (power transmission belt)
47: tensioner
48: cover
49: optical sensor
54: tooth cloth
72: optical sensor holding member
73: light shielding device
80: degradation-exchange judgment section
81: setting subsection
82: increased light determination subsection
83: pattern determination subsection
84: exchange judgment subsection
85: measured value of the light
86: average measured value of the light
87: degradation threshold value
88: pulse waveform (peaked)

The invention claimed is:

1. A power transmission apparatus, comprising:
a drive pulley supported on a drive shaft,
a driven pulley supported on a driven shaft,
a power transmission belt wound around the drive pulley and the driven pulley and containing a stress light emission material to emit light in response to an external force exerted thereon,
an optical sensor disposed in face-to-face relationship with the power transmission belt to measure the light emitted by the power transmission belt, and
an exchange judgment unit that judges whether or not the power transmission belt is deteriorated based on the measured value of the light detected by the optical sensor, and judges that a belt exchanging time is reached with the judgment indicating that the power transmission belt is deteriorated,
the exchange judgment unit comprising a deterioration-exchange judgment section adapted to judge that the power transmission belt is deteriorated with the belt exchanging time reached at least one of the times when the measured value of the light exceeds a predetermined light emission threshold value and when the measured value of the light is varied in a predetermined light emission pattern,
the power transmission belt being constituted by a toothed belt having a tooth surface and a tooth cloth provided on the tooth surface,
the optical sensor being disposed in face-to-face relationship with the tooth cloth of the toothed belt,
and the deterioration-exchange judgment section comprising a setting subsection, an increased light determination subsection, a pattern determination subsection, and an exchange judgment subsection, the setting subsection being adapted to set an average measured value of the light based on the measured value of the light detected by the optical sensor at the initial stage of the power transmission belt wound around the drive pulley and the driven pulley and to set the predetermined light emission threshold value with a predetermined value being added to the average measured value of the light, the increased light determination subsection being adapted to judge that the power transmission belt is deteriorated when the measured value of the light exceeds the predetermined light emission threshold value, and the pattern determination subsection being adapted to judge that there is a crack generated in the tooth cloth at a specific portion of the power transmission belt and that the power transmission belt is deteriorated when the measured value of the light at a specific portion of the power transmission belt is periodically peaked and when the measured value of the light is varied in the light emission pattern, the exchange judgment subsection being adapted to judge that the power transmission belt reaches the belt exchanging time when at least one of the increased light determination subsection and the pattern determination subsection judges that the power transmission belt is deteriorated.

2. The power transmission apparatus as set forth in claim 1, which further comprises a tensioner disposed between the drive pulley and the driven pulley, the tensioner being adapted to press the power transmission belt from the back side of the power transmission belt, and in which the optical sensor is disposed at a position facing the portion of the power transmission belt immediately after the portion of the power transmission belt passes through the tensioner.

3. The power transmission apparatus as set forth in claim 1, which further comprises a cover adapted to entirely cover the power transmission belt and shield the light, the cover comprising an optical sensor holding portion and a light shield portion, the optical sensor holding portion being adapted to hold the optical sensor in a face-to-face relationship with the power transmission belt, the light shield portion configured to surround at least part of a periphery of the optical sensor holding portion excluding a region of an optical path from the power transmission belt to the optical sensor.

4. The power transmission apparatus as set forth in claim 1, in which the drive shaft is constituted by a crankshaft of an internal combustion engine, the driven shaft is constituted by a camshaft of the internal combustion engine, and the power transmission belt is constituted by a timing belt.

5. A power transmission apparatus, comprising:
a drive pulley supported on a drive shaft,
a driven pulley supported on a driven shaft,
a power transmission belt wound around the drive pulley and the driven pulley and containing a stress light emission material to emit light in response to an external force exerted thereon,
an optical sensor disposed in face-to-face relationship with the power transmission belt to measure the light emitted by the power transmission belt, and
an electronic control unit programmed to detect whether or not the power transmission belt is deteriorated based on the measured value of the light detected by the optical sensor, and judges that a belt exchanging time is reached with the judgment indicating that the power transmission belt is deteriorated,
the electronic control unit being programmed to judge that the power transmission belt is deteriorated with the belt exchanging time reached at least one of the times when the measured value of the light exceeds a predetermined light emission threshold value and when the measured value of the light is varied in a predetermined light emission pattern,
the power transmission belt being constituted by a toothed belt having a tooth surface and a tooth cloth provided on the tooth surface,
the optical sensor being disposed in face-to-face relationship with the tooth cloth of the toothed belt,
and the electronic control unit being programmed to set an average measured value of the light based on the measured value of the light detected by the optical sensor at the initial stage of the power transmission belt wound around the drive pulley and the driven pulley and to set the predetermined light emission threshold value with a predetermined value being added to the average measured value of the light, to judge that the power transmission belt is deteriorated when the measured value of the light exceeds the predetermined light emission threshold value, to judge that there is a crack generated in the tooth cloth at a specific portion of the power transmission belt and that the power transmission belt is deteriorated when the measured value of the light at a specific portion of the power transmission belt is periodically peaked and when the measured value of the light is varied in the light emission pattern, and to judge that the power transmission belt reaches the belt exchanging time when the electronic control unit judges that the power transmission belt is deteriorated.

* * * * *